March 29, 1960 L. MACHTS 2,930,977
METHOD OF AND DEVICE FOR DETECTING DIFFERENCES
AND CHANGES IN BODIES
Filed May 29, 1956 3 Sheets-Sheet 1
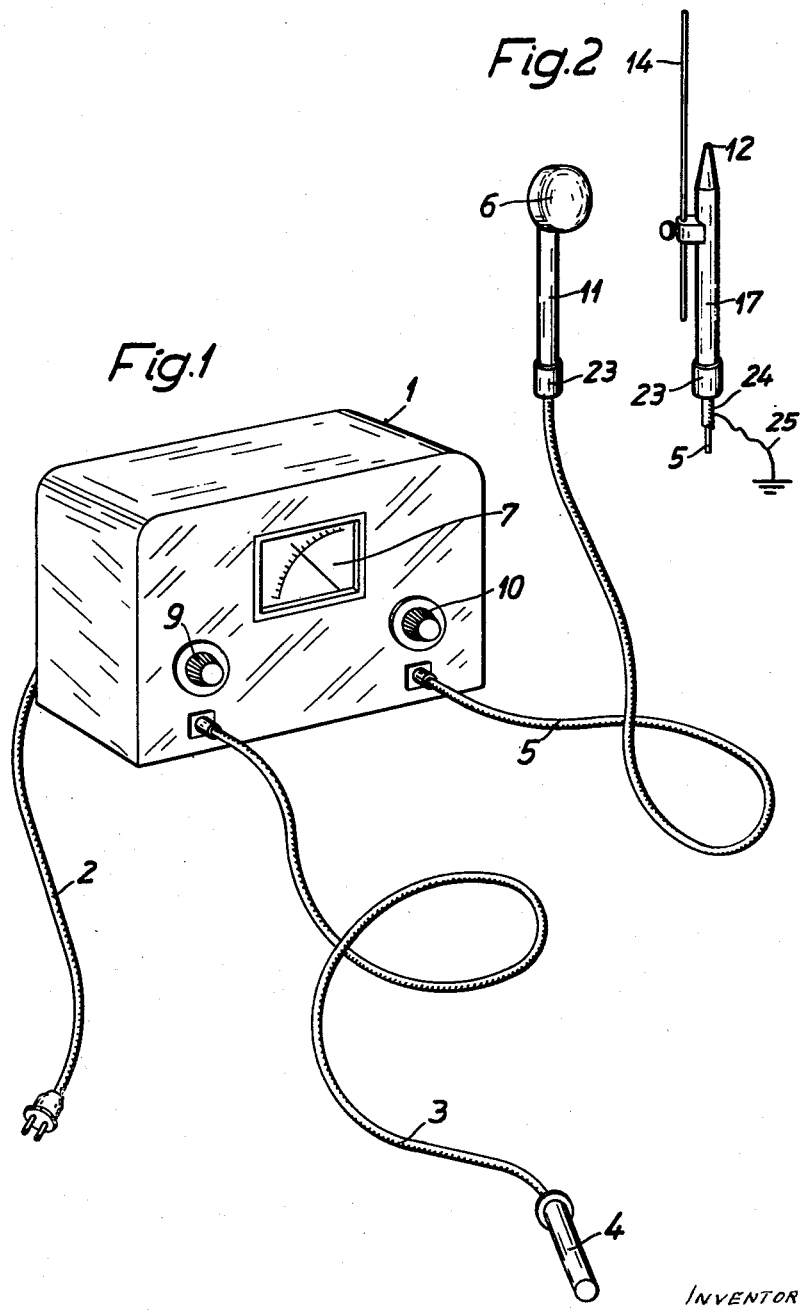
INVENTOR
LUDWIG MACHTS
by Walter S. Pleston
ATTORNEY March 29, 1960

L. MACHTS 2,930,977

METHOD OF AND DEVICE FOR DETECTING DIFFERENCES AND CHANGES IN BODIES

Filed May 29, 1956

INVENTOR
LUDWIG MACHTS
by Walter S. Bleston
ATTORNEY

INVENTOR
LUDWIG MACHTS

United States Patent Office 2,930,977
Patented Mar. 29, 1960

2,930,977
METHOD OF AND DEVICE FOR DETECTING DIFFERENCES AND CHANGES IN BODIES

Ludwig Machts, Marburg an der Lahn, Germany

Application May 29, 1956, Serial No. 588,107

Claims priority, application Germany June 2, 1955

6 Claims. (Cl. 324—71)

The present invention relates to a method and a device which is adapted to detect differences and changes in bodies of any kind by measuring the electrical characteristics thereof.

There have already been proposed certain methods of measuring the characteristics or properties of bodies, whereby the body or member under test is placed into an electric field produced by two condenser plates and whereby one of the known measuring methods is used to detect and record the changes in capacity produced by the presence of inhomogeneous regions. However, these known methods have a drawback in that they do not permit the accurate position of such inhomogeneous regions in the body under test to be established. More in particular, it is impossible, by said known methods, to determine whether an inhomogeneous region or discontinuity is located near the front or near the rear side of the body under investigation. Even greater difficulties are encountered in cases in which a plurality of inhomogeneous regions are spaced apart in said body in the direction of the electric field. From the above it follows that these known methods can only be applied to detect the over-all changes in a given body as a function of time.

It is one object of the present invention to provide a method and a device adapted accurately to determine the presence of differences, discontinuities and changes within the body under test and also to determine with accuracy the magnitude of such differences and changes. It is a further object of the invention to provide a method whereby a given body can first be subjected to a broad survey so as to establish the approximate location of any differences and changes that may be present within said body, and whereby, after the general regions in which such differences or changes are present have been established, more detailed measurements can be performed in order to produce more accurate results.

The above objects are achieved according to the invention by means of a device adapted to detect differences and changes and comprising a source of electricity, preferably an alternating current source, and an electric measuring instrument in circuit with said source, one pole of said source being fixedly coupled with the body under test, and at least one other movable electrode forming the other pole, the last-mentioned electrode being equipped with a device adapted to measure the distance between said electrode and the regions of said body to be tested.

The measurements in which the device of the invention is used can be performed in various ways. Where a general survey is to be made of the body under test, it is convenient to provide for the pointer of the electrical measuring device to be maintained at a given indicating position while the distance between the movable electrode and the various portions of the said body is varied, the various distances associated with the constant reading of the measuring device then being compared. In the event this test has established the presence of differences or changes in certain portions of the body under test, it is then preferred to move the movable electrode or electrodes across the said portions at a uniform distance therefrom and to take readings from the measuring instrument for use as a basis of comparison.

That pole which is fixedly coupled with the body under test may be coupled therewith either galvanically or inductively or capacitively or by any desired combination of these methods. The source of current may be an oscillator, preferably an oscillation-producing tube or a transistor. Moreover it is possible to use as an alternating current source an existing natural or artificial field such as may be produced by mains oscillations, transmitter oscillations or oscillations emanating from the body under test itself, the said oscillations being in each case suitably amplified to permit the said measurements to be performed.

To permit test to be conducted rapidly, a plurality of electrodes may be used simultaneously to scan the body under test, the results produced by the individual electrodes being successively transmitted by means of a commutator to a cathode-ray tube, for example, so as to produce a simultaneous visible picture of the various measuring results.

Other objects, features and advantages of the present invention will be readily apparent from the following detailed description of certain preferred embodiments thereof taken in conjunction with the accompanying drawings, in which:

Fig. 1 is a perspective view of the measuring instrument, including the poles or electrodes connected therewith by cables;

Fig. 2 is a perspective view of a different embodiment of one of the two electrodes which is used as a measuring electrode;

Figure 5:
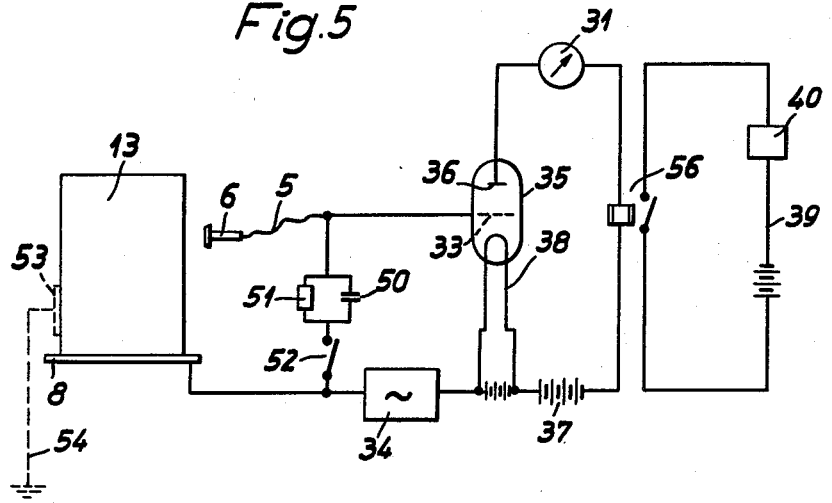
Fig. 5 is a schematic circuit diagram of the measuring instrument.

The measuring instrument 1 shown in Fig. 1 comprises a source of alternating current in the form of an oscillator or an oscillating tube which is connected to a power supply system by a cable 2. From the instrument 1, a cable 3 which is connected to an alternating current source 34 (Fig. 5) leads to a pole member 4 or 8 which is suitably shaped so as to be adapted to effect a capacitive, inductive, galvanic or combination-type coupling with the body to be tested. This pole or electrode may be in the form of a handle 4 to be grasped by the person to be examined or in the form of a base plate 8 (Fig. 5) on which any type of body under test may be placed.

Upon the pole member 4 or 8 being brought into contact with the body or person to be examined, there will be developed within the said body an electric field the intensity of which will vary at those places at which the body is inhomogeneous. The position of the places of varying field strength is indicative of the location of inhomogeneous regions within the body under test.

To permit the location of such regions to be established, there extends from the instrument 1 another cable 5 one end of which is connected to the indicating instrument 31 (Fig. 5), the other end of said cable being connected to a measuring electrode 6 which constitutes the other pole of the capacitive, inductive, etc., coupling with the body under test which latter is connected to the current source disposed within the instrument casing 1; the construction of the measuring electrode 6 is dealt with in greater detail further below. The electrode 6, which has a handle 11, is approached to the body under test which is under the influence of the electric field, and the energy received by the electrode is connected back to the instrument 31 in the casing 1, which instrument renders the energy readable on the graduated scale 7.

Different amounts of deflection of the pointer along the scale 7 of the instrument 1 will be obtained depending on the extent to which the electrode is moved towards the body under test. Where the electrode is used to scan a second portion of said body which differs from a first portion, the deflection of the pointer will differ from the deflection obtained for the first portion, provided that the distance of the electrode 6 from said body is the same. It will thus be understood that the deflection of the pointer of the indicating instrument depends on both the intensity of the electric field prevailing within the range scanned and the distance between the electrode and the body under test.

It will, therefore, be seen that a body 13 may be tested by maintaining the measuring or testing electrode at a predetermined distance from the body under test and by taking readings of the pointer deflection from the scale 7 of the indicating instrument. Easily readable values of the pointer deflection may be provided for by suitably controlling the strength of the electric field developed in the body under test through the medium of the cable 3, a control member 9 being provided for this purpose, and by suitably controlling the energy absorbed by the electrode 6, for which purpose another control member 10 is provided; in doing so, the distance between the testing electrode and the body under test will also have to be suitably selected. To test the body 13, the testing electrode 6 is successively brought into the vicinity of the portions of the body which are of interest in regard to the test, the distance between the testing electrode and the surface of the body being varied to give a constant pointer deflection reading on the scale 7 of the indicating instrument. The distances between the electrode 6 and the surface of the body which are observed with the indicator reading maintained constant will then differ from one another if the various portions of the body tested have different characteristics. It is these distances that are measured for the purpose of being compared with one another or with known standard values so as to provide information as to the differences or changes existing in or on the body under test.

It will be understood that it is necessary to provide certain standard values with which the results of the tests may be compared. This applies particularly to the testing of the human body since the human body and its limbs must be considered as inherently inhomogeneous structures. The said standard values are obtained by recording the results of tests performed on a healthy body, and it is convenient to plot these test results in the form of curves which serve as standards in regard to the respective portions of the human body. A comparison between the said standard curves with those obtained from a test subject will show certain deviations which will lie either above or below the respective standard curve, this depending on the type of change or disease involved; the absolute magnitude of such deviations is of less importance than the presence of a relative change or deviation.

The testing procedure may also be such that a suitable uniform distance between the electrode and the body under test is maintained and that the varying deflections of the pointer of the indicating instrument are observed and interpreted; in this instance, the indicating instrument is preferably calibrated to read the differences in the intensity of the electric field in the respective distances of an electrode of a given type. This latter method is particularly convenient where it is intended to test small areas for the purpose of accurately locating minor changes or differences within or on the body under test. In the case of such local investigations it is preferred to use an electrode the area of which is only 1 square centimeter (.155 square inch) or less. Such an electrode is indicated at 12 in Fig. 2. In order to provide for a constant distance between the surface of the body under test and this electrode during the test, this electrode 12, which also has a handle 17, may carry a spacing piece 14 which may be of variable length in its longitudinal direction or which may be longitudinally adjustable relative to the electrode. For example, the said distance piece may take the form of a rod or sleeve which is threadably received by a lug provided on the electrode 12 so as to be capable of being advanced and withdrawn in a manner known from a micrometer screw.

Figure 3:
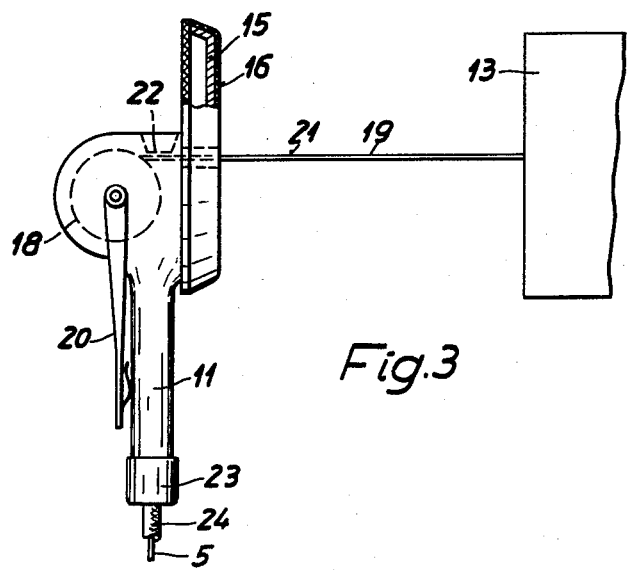
Fig. 3 is a side elevational view of the measuring electrode, partly in section, together with an extensible and retractable scale serving to measure the distance of the electrode from the body under test.

Fig. 3 illustrates a large-size electrode 16 for the testing of major areas of the body under test; for the purpose of providing a capacitive coupling, for example, this electrode may comprise a capacitor plate 15 which is disposed within a casing 16. The diameter of the active surface of this electrode is preferably between 5 centimeters and 20 centimeters (2 and 8 inches) and the electrode is fitted with a housing 18 containing a tape measure 19 permitting the electrode distance to be measured, the unused portion of said tape measure being stored by winding it up within the housing 18, and the tape measure being extensible in a direction parallel to the axis of the electrode proper. The tape measure is acted upon by spring force which tends to extend the tape measure 19 through the electrode 6 from the housing 18 and perpendicularly to the surface of the body 13 to be tested. Also provided on the electrode unit is a detent member 20 which is adapted to lock the tape measure in any desired position and which may be depressed to unlock the tape measure while rolled up or partially extended so as to cause the tape measure 19 to be extended or further extended by spring force. The extent to which the tape measure 19 has been extended may be read from its scale 21 through a window 22 of its housing 18, so that a direct reading of the distance between the electrode 6 and the body 13 can be obtained. The tape measure may also be locked in position by means of a clamping screw. It is possible with the aid of the locking means just described to lock the tape measure 19 in that extended position which gives the desired constant distance between the electrode and the body in cases in which it is intended to observe variable pointer deflections.

However, in the case of this method, which is particularly suitable for local high-precision tests, it is convenient to substitute the small-area electrode of Fig. 2 for the electrode 6. For this purpose the electrodes have plug-in connectors 23 permitting the electrodes to be connected to the current source 34 of the measuring unit 1 by means of a cable 3. Moreover, the electrode heads may be adapted to be interchangeable.

In order to prevent the test results from being influenced by the person conducting the tests, the complete apparatus, with the exception of the receiving surface of the electrode, particularly the cable 3, is provided with a low-induction shielding means 24. The shielding means may be connected to a grounding wire for the purpose of dissipating any undesirable extraneous electric influences that might affect the test results.

For the purpose of measuring electrode-to-body distances there may also be provided a measuring lever which is pivotally mounted laterally of the electrode 6, the said measuring lever being adapted to be rocked until it touches the body under test. The angle thus adjusted between the measuring lever and the testing electrode will then be a measure of the electrode-to-body distance. As has already been mentioned, there may also be provided a distance piece 14 which may be screwed forward or backward in the direction of the axis of the electrodes 6 and 12, respectively, said distance piece also permitting the electrode-to-body distance to be measured.

Figure 4:
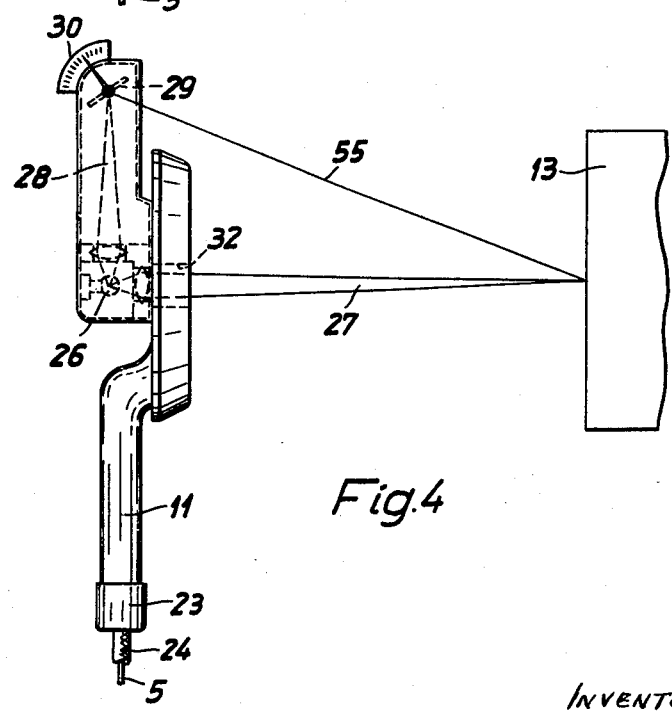
Fig. 4 is a part-sectional side elevation of a measuring electrode which is equipped with an optical range finder.

Furthermore, there may be provided an optical range finder of any suitable construction which affords an advantage over mechanical distance measuring means in that it will not alter the electric field between the body under test and the testing electrode, since there are no scales and the like arranged between the body and the electrode. Fig. 4 illustrates a particularly suitable optical range finder in combination with an electrode 6. This range finder comprises a point-shaped light source 26 disposed to the rear of the electrode and emitting a pencil of light 27 through a central aperture 32 in the electrode 6 so that the light strikes the surface of the body 13 at right angles. Another pencil of light 28 emanating from the source 26 is directed towards a mirror 29 which is pivoted about its central axis; for the purpose of determining the electrode-to-body distance it is necessary to adjust the mirror 29 in such a manner that the pencil of light 55 reflected by the mirror is brought into registry on the surface of the body 13 with the pencil of light 27 passing through the aperture 32 in the electrode 6. The angular position of the mirror 29 may be provided for to be read from a scale 30.

An amplifier tube may be used to amplify the electrical energies received by the electrodes during a test. As will be seen in Fig. 5, the electrode 6 or 12, respectively, is connected to the grid 33 of the amplifier tube 35 by a conductor 5, while the electrode 36 of the tube is coupled with the indicating instrument 31. The electrode circuit is completed by a battery 37, part of the anode current circuit 38 of the amplifier tube 35 and back to the alternating current source 34 of the measuring unit 1.

In order to ensure that the test is performed with the deflection of the pointer of the indicating instrument 31 being maintained constant, a relay 56 may be connected in circuit with the instrument 31, this relay being adapted, upon a given deflection of the pointer being reached, which deflection may, if desired, be adjustable, to close a signalling circuit 39 to be closed so that an acoustic or optical signalling device is operated.

It will be understood that other signalling devices of known construction may be used which become operative upon a predetermined indicator reading being reached. For example, the pointer of the indicating instrument 31 may be arranged to uncover a narrow slit upon a predetermined point on the scale being reached by the pointer, said slit allowing a pencil of light to pass through. It is also possible to use an optical signal in the form of a so-called magic eye. Such signalling devices will greatly facilitate and expedite the measuring of the distance between the electrode 6 or 12 and the body under test 13.

Figure 6:
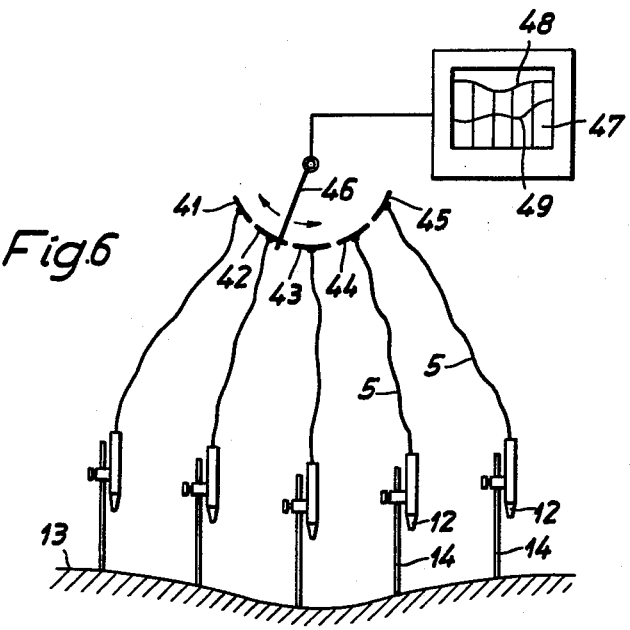
Fig. 6 is a diagrammatic representation of the method by which the energies simultaneously received by a plurality of measuring electrodes are transmitted to an indicating screen.

The device of the invention may also be arranged for the simultaneous use of a plurality of electrodes in order to permit complete series of tests to be conducted rapidly. This method of using several testing electrodes simultaneously is particularly suitable in combination with the method of using a constant electrode-to-body distance. Fig. 6 illustrates an example in which five electrodes 12 are being used, their associated distance pieces 14 serving to maintain all electrodes at a fixed distance from the surface of the body 13. In order to permit the test results thus obtained simultaneously to be observed or recorded, each of the electrodes is connected with one of the contacts 41, 42, 43, 44 and 45. A rotary contact arm 46 successively connects the said contacts 41 to 45 with the deflecting plates of a cathode-ray tube, the electron beam of the said tube being simultaneously shifted laterally by a synchronous auxiliary voltage which corresponds to the movement of the contact arm 46 at any given moment. Since each electrode 12 produces a certain deflection of the cathode ray of the tube, a curve 48 will be produced on the screen 47 of the tube.

A transparent template showing a standard curve 49 of the type discussed earlier is placed in front of the screen 47 of the cathode-ray tube so as to permit the test results to be immediately compared with the standard curve, it thus being possible to observe any deviations that may be present.

In order to render the results of the tests practically useful, there is provided a calibrating unit comprising a capacitor 50 which is connected in parallel with a resistor 51 of known magnitude, the said calibrating unit being interposed between the conductor 3 from the one pole or electrode and the line 5 leading to the other pole which is constituted by the electrode 6 or 12, respectively. For the purpose of conducting the tests proper, this calibrating unit may be rendered inoperative by means of a switch 58, i.e. after a comparison standard has been determined which is required for the test to be conducted. The sensitivity ratio thus obtained is then used as a comparison standard or reference. Provided within the casing 1 are control means operable by means of the controls 9 and 10 shown in Fig. 1 and adapted to regulate either the energy emitted by the pole 4 or 8 or the electric energy received by the electrode 6 or 12. These control means permit the test results or indicator readings to be placed within such ranges that the pointer deflections can be accurately observed and that undesirable basic oscillations below the pointer deflections are eliminated.

The pole member 4 or 8, respectively, which serves to build up an electric field in the body under test, may be coupled to said body by capacitive, inductive or galvanic means or by any desired combination of such means. The said pole member may also be arranged in any other suitable manner so as to radiate energy towards the body under test; such pole members may take the form of a wire (open antenna), coil, plate, wire mesh, grid and the like. Such pole members may be arranged at a major distance from the body under test. In certain instances it may not be necessary to use a pole member 4 to establish an artifical electric field within the body under test, but any existing form electric energy may be used in performing the test, provided only that such electric energy either influences the body under test or is influenced by the latter. It is also possible to utilize energy that is produced by the body under test itself or that is impressed to said body by the atmosphere. In the latter case it is convenient to hold a plate 53 against the body, the plate 53 being grounded by a wire 54.

Use is preferably made of alternating current to establish an artificial electric field within the body under test. However, the tests may also be performed in the presence of a D.C. field, it being recommended in this case to reverse the polarity from time to time in order to provide accurate test conditions.

Where bodies are tested with the aid of artificially applied or produced or with existing natural fields, dipoles may be used as electrodes, the distances between these dipoles and the surface of the body and the mutual distances between the dipoles being measurably varied until a predetermined deflection of the pointer of the indicating instrument is obtained, at which the mutual distances of the dipoles or the distances between the dipoles and the body surface is measured.

The electrodes or dipoles, respectively, may be mounted on tripods and the like which comprise a plurality of mutually pivoted parts permitting the electrodes or dipoles to be brought into any desired position.

The methods and devices of the invention may be used to detect differences and/or changes in chemicals, drugs, liquids, crystals and bodies of any kind. It is also possible by means of said methods and devices to inspect welded connections and other fastenings and to observe their characteristics. Such bodies to be tested will preferably be placed on a base plate for the purpose of coupling them to the device used.

It is also possible by means of the methods and devices of the invention to detect atmospheric influences on the bodies under test. For example, living organisms exhibit a behaviour that is different as they are brought to places on the earth's surface where different electric conditions prevail as may be objectively tested by observing the reactions of such organisms and the associated electrode distances. It will thus be possible to detect areas on the earth's surface that are either favorable or unfavorable for living organisms.

The method and device of the invention may be used to particularly great advantage to observe healing processes within the bodies of persons suffering from certain diseases and measurably to account for the seat of the disease. In doing so it will be possible to detect and observe phenomena that have hitherto not been capable of detection by X-rays.

Another field of application of the invention is the testing of the action of drugs. For example, it can be ascertained within minimum time whether a drug administered to cure a certain pathological change has a positive or negative influence on the organ involved, the criterion being whether or not the test results approach the standard condition or are being further removed therefrom.

I claim:

1. A method of detecting impedance differences in an electrically conductive body, comprising the steps of placing one terminal of an alternating-current source in contact with said body, positioning another terminal of said source at a distance from said body within a range in which measurable currents can pass through said terminals by way of said body, ascertaining the magnitude of said currents, and determining the distance of said other terminal from said body in a position in which said magnitude attains a predetermined value.

2. A method of detecting impedance differences in an electrically conductive body, comprising the steps of placing one terminal of an alternating-current source in contact with said body, positioning another terminal of said source at a distance from said body within a range in which measurable currents can pass through said terminals by way of said body, ascertaining the magnitude of said currents, spacedly displacing said other terminal across the surface of said body within said range, varying the spacing of said other terminal from said body in a manner maintaining said magnitude at a constant value, and determining the distance of said other terminal from said body corresponding to said value.

3. A method of detecting impedance differences in an electrically conductive body, comprising the steps of placing one terminal of an alternating-current source in contact with said body, positioning another terminal of said source at a distance from said body within a range in which measurable currents can pass through said terminals by way of said body, ascertaining the magnitude of said currents, spacedly displacing said other terminal across the surface of said body within said range, obtaining a preliminary reading of body impedances by varying the spacing of said other terminal from said body in a manner maintaining said magnitude at a constant value, determining the distance of said other terminal from said body corresponding to said value, and obtaining a more accurate reading of body impedances by displacing said other terminal across a localized area of said body at a fixed distance while measuring any departure of said magnitude from said constant value.

4. A method according to claim 3 wherein said other terminal is provided with a relatively large pick-up surface during said preliminary reading and with a relatively small pick-up surface during said more accurate reading.

5. In a device for detecting impedance differences in an electrically conductive body, in combination, circuit means for passing an alternating current of fixed frequency through said body, said circuit means including a pick-up electrode and spacer means for maintaining said electrode at a distance from said body within a range in which currents traversing said body can be picked up by said electrode, meter means for indicating the magnitude of said currents, a handle means serving as a support for said electrode and said spacer means, said spacer means being extensible from said handle means, and means for locking said spacer means at predetermined extended positions, and adjusting means for said spacer means adapted to vary said distance within said range.

6. In a device for detecting impedance differences in an electrically conductive body, in combination, circuit means for passing an alternating current of fixed frequency through said body, said circuit means including a pick-up electrode and spacer means for maintaining said electrode at a distance from said body within a range in which currents traversing said body can be picked up by said electrode, meter means for indicating the magnitude of said currents, a handle means serving as support for said electrode and said spacer means adjusting means for said spacer means adapted to vary said distance within said range, said spacer means having a distance withmarked thereon, and a viewing window housing supported by said handle for indicating the distance said spacer means is extended.

References Cited in the file of this patent

UNITED STATES PATENTS

| 1,990,085 | Mudge et al. | Feb. 5, 1935 |
| 2,241,190 | Fenning | May 6, 1941 |
| 2,298,125 | Hartman | Oct. 6, 1942 |
| 2,384,529 | Breitenstein | Sept. 1, 1945 |
| 2,429,968 | Stanphill | Oct. 28, 1947 |
| 2,438,506 | Ladrach | Mar. 30, 1948 |
| 2,482,773 | Hieronymus | Sept. 27, 1949 |
| 2,599,583 | Robinson | June 10, 1952 |
| 2,656,507 | Fielden | Oct. 20, 1953 |
| 2,720,624 | Gunst | Oct. 11, 1955 |